Dec. 18, 1923.
F. PUNGA ET AL
1,478,252
BAR WINDING FOR ELECTRIC MACHINES
Filed Aug. 16, 1920    2 Sheets-Sheet 1
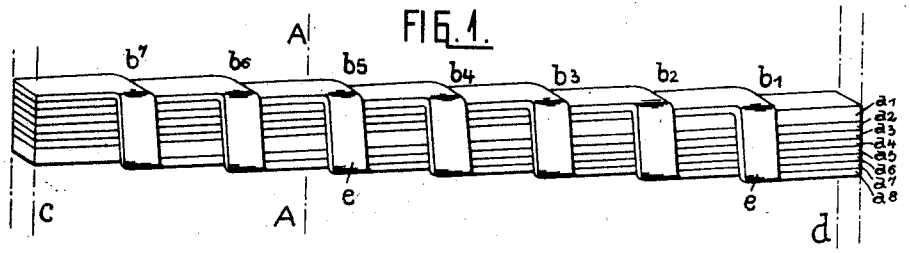
FIG.1.
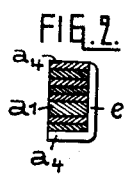
FIG.2.
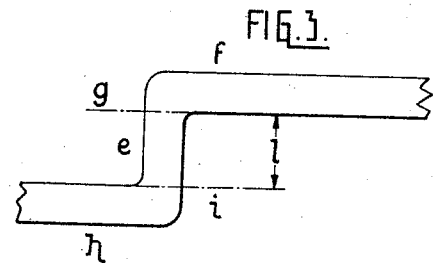
FIG.3.    FIG.4.
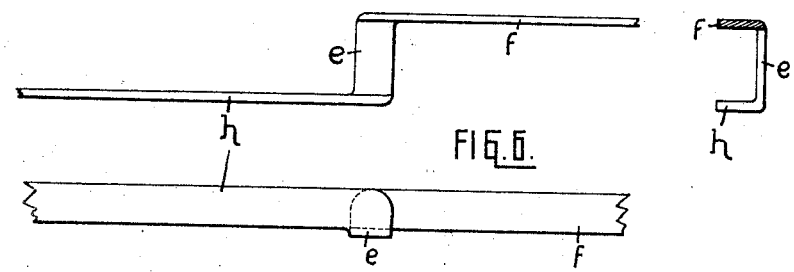
FIG.5.    FIG.7.
FIG.6.
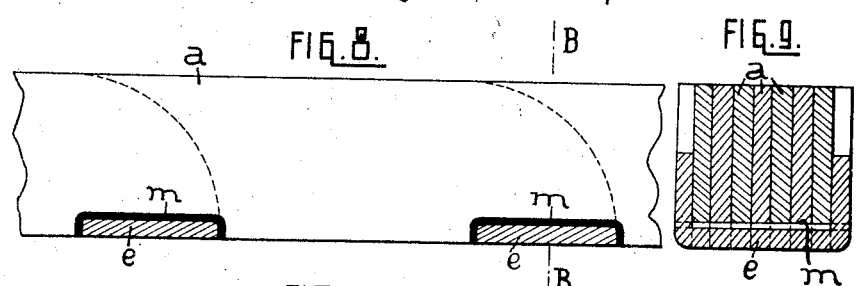
FIG.8.    FIG.9.
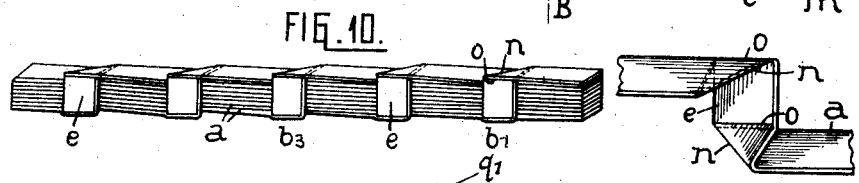
FIG.10.
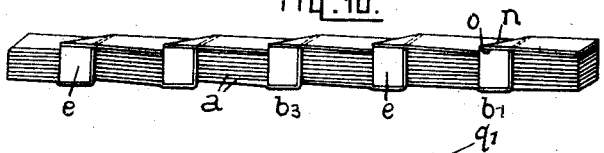 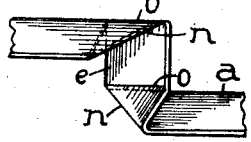
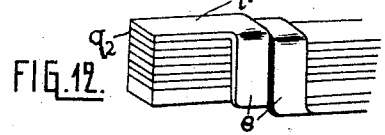
FIG.12.    FIG.11.
INVENTOR
Franklin Punga
Hermann Ross Dec. 18, 1923. 1,478,252

F. PUNGA ET AL

BAR WINDING FOR ELECTRIC MACHINES

Filed Aug. 16, 1920  2 Sheets-Sheet 2

INVENTOR

Patented Dec. 18, 1923.

1,478,252

UNITED STATES PATENT OFFICE.

FRANKLIN PUNGA, OF MUHLHEIM-RUHR-SPELDORF, AND HERMANN ROOS, OF MUHLHEIM-RUHR, GERMANY.

BAR WINDING FOR ELECTRIC MACHINES.

Application filed August 16, 1920. Serial No. 404,034.

*To all whom it may concern:*

Be it known that we, FRANKLIN PUNGA, a citizen of Germany, and a resident of Muhlheim-Ruhr-Speldorf, Germany, and HERMANN Roos, a citizen of Germany, and a resident of Muhlheim-Ruhr, Germany, have invented certain new and useful Improvements in Bar Windings for Electric Machines, of which the following is a specification.

This invention relates to windings of electrical machines (generators, motors) which consist of bars or rods made up of a number of metal layers or bars of flat cross section piled up on each other and connected in parallel. The construction of the winding is such that an uneven distribution of the alternating current resulting from the alternating induced lines of force is prevented. Attempts have often been made to accomplish this object in other "bar windings" through altering the position of the layer of each of the partial or colateral flat conductors or laminæ of which the bar consists in the portion of it that is located in the active iron of the machine, this change of layer being effected by crossing or transposing the colateral conductors; the crossing or transposing operation being carried out in such a manner as to cause each colateral conductor to occupy at different points in its passage through the machine groove or slot or line of slots, all of the layers contained in the bar. The new bar winding consists of a single group of individual flat colateral conductors stacked one above the other, and by a very simple and advantageous plan the top colateral conductor in any section previous to a point of change in the layer, is made to occupy the second top layer in the next section, while the second top colateral conductor in the previous section occupies the third top layer in the next section and so on. This is accomplished by so shaping the colateral flat conductors or laminæ that at each point where the positions of the layers are changed, the undermost lamina passes out of its layer and extends laterally upwards past all the other laminæ, and then bends round so as to form or occupy the topmost layer of the laminated conductor or bar. The lateral upwardly extending portion of each colateral conductor has its flat portion bearing against the edges of the other colateral conductors that it passes. The described plan permits of the colateral conductor or lamina, which lies uppermost at the point where the bar enters a slot of the machine and undermost where the bar passes out of the slot, passing straight or without bend through the slot. Hence this lamina can easily be made with a larger cross-section than the other laminæ so as to increase the strength of the entire winding bar.

Some ways of carrying out the invention are illustrated in the drawing in which—

Fig. 1 is a perspective side view of the laminated winding bar and

Fig. 2 is a cross section on the line A—A of Fig. 1.

Fig. 3 illustrates an initial stage in the process of bending the colateral conductors or laminæ.

Fig. 4 is a section of Fig. 3 viewed from the right.

Fig. 5 shows the laminæ of Fig. 3 at the finish of the bending process.

Fig. 6 is a top view and

Figure 13:
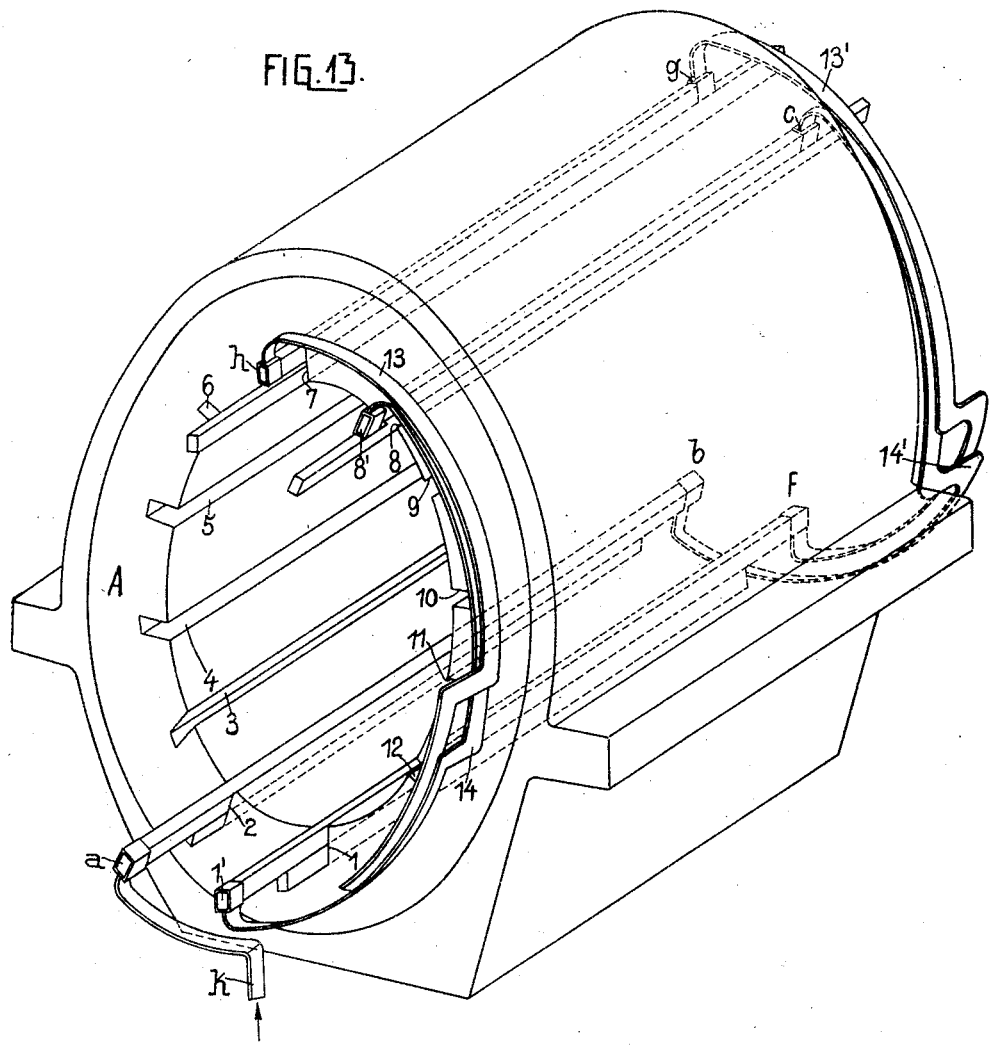

Fig. 7 a section of Fig. 5.

Fig. 8 illustrates a horizontal longitudinal section of a modified bar and

Fig. 9 a cross section on the line B—B of Fig. 8.

Fig. 10 is a perspective side view of another modification and

Fig. 11 a perspective representation of the manner of bending a lamina for a bar according to Fig. 10.

Fig. 12 is a perspective side view of a further modification.

Fig. 13 is a perspective view of a stator of a two-pole multi-phase current generator in which the manner of building up machine windings with the aid of bars executed as shown in the above-mentioned figures is shown.

The iron core or active iron A of the machine, which is built up in a known manner of iron sheets or laminæ, has slots 1 to 12 made in it for the reception of the winding bars each comprising two bar members placed one above the other in each slot. The windings in the slots 3, 4, 5, 6, 9, 10, 11 and 12 have been omitted to show the arrangement of the windings or bars more clearly. Each end of each of the conductors or bars is connected to the end of the diametrically opposite bar by means of a curved end connector 13, or 14, each end connector being arranged to interconnect a short underlying bar 8′ and a long superimposed bar member 1′ of the bar.

The connections may be such that the current enters through the lead $k$ into the superimposed bar member 1 at $a$ in the slot 2 and passes along the bar to the end $b$, whence it flows through a curved end connector 14′ at the rear of the machine to the diametrically opposite end $c$ of the underlying bar member in slot 8, and thence to the bar member 8′. From 8′ it passes through the connector 14 to the end 1′ of the superimposed bar member in slot 1 and thence to $f$, $g$, $h$ and through the connector 13, which is only partly shown, but whose continuation would lead to a bar in the slot 12. The winding progresses in the manner thus indicated until all of the slots have been traversed.

The curved end connectors 13, 14, 13′, 14′ etc. are made of solid metal, but the bars in the slots are laminated as shown in Figs. 1 to 12 and hereinafter described.

In the type of bar shown in Figs. 1 and 2 the entire conductor or winding bar consists of 8 colateral conductors or laminæ $a^1$ to $a^8$ of flat rectangular cross section which are stacked one above the other and insulated from each other by paper, cotton, micanite or the like. Considerable advantage is often derived from the use of an insulating varnish or lacquer which, if raised to a sufficiently high temperature, will, on the application of a heavy pressure, which is sometimes required, result in the sticking together of the various laminæ. Laminæ which are insulated by a coating of enamel, or, if aluminium is used, oxidised laminæ may also be employed. There are seven points where a change of the layers occupied by the laminæ occur. These seven points of change or transpositions are designated $b^1$ to $b^7$. The lamina $a^1$ which is at the top in the first section, is in the second top layer in the section that lies between the transpositions $b^1$ and $b^2$, and in the third top layer between the transpositions $b^2$ and $b^3$ and so forth; in the last section it occupies the bottom layer. The second top lamina $a^2$ in the first section occupies the third top position in the second section between $b^1$ and $b^2$ and so forth; the bottom lamina $a^8$ in the first section is transposed at the first point of change $b^1$ by being passed laterally upwards and occupies the top layer in the second section between the transpositions $b^1$ and $b^2$; the bottom lamina $a^7$ in the second section passes upwards at the second point of change $b^2$ and occupies the top position in the third section, and so on. In this way all of the eight different laminæ occupy for equal sections of their lengths eight different layers in the machine slot which extends from $c$ to $d$. A manner in which the transposition of the bottom lamina in any section to the top layer in the next section may be carried out is illustrated in Figs. 3 to 7. Each lamina is bent on edge at its point of transposition in such a manner as to produce a Z-shaped bend as shown in Fig. 3 with a middle piece $e$ of a length $l$ corresponding to the thickness of seven laminæ. Fig. 4 is side view of Fig. 3 as viewed from the right. After the lamina has been bent on edge as shown in Figs. 3 and 4 it is bent on its flat side into the shape indicated in Figs. 5 to 7. The limbs $f$ and $h$ are both bent at right angles in the same sense of rotation, the limb $f$ being bent on the axis indicated by the dash and dot line $g$, Fig. 3, and the limb $h$ being bent on the axis $i$. The positions occupied by the limbs $g$ and $h$ after the completion of the bending process are shown most clearly in Fig. 7. The individual laminæ $a^1$ to $a^8$, when put together, result in the bar illustrated in Figs. 1 and 2.

It will be evident that the lamina $a^1$, which is at the top in the first section and at the bottom in the last section, need not be bent or transposed. This lamina can therefore be made thicker than the others.

In the case of the bar shown in Figs. 1 and 2 the lateral limbs $e$, which extend with their flat faces past the edges of the other laminæ, project laterally from the rod. To prevent this and to produce a bar with smooth sides or edges, recesses or notches are made in the various laminæ as shown in Fig. 8. When the laminæ having recesses of this kind are stacked together, lateral grooves are formed by the recesses, which grooves extend vertically or obliquely to the longitudinal axis of the rod, and in which the transposition pieces $e$ lie insulated from the laminæ which they pass. This is illustrated in Figs. 8 and 9 by a horizontal section and cross section B—B respectively on an enlarged scale. In these figures $a$ represents the laminæ, $m$ the groove, and $e$ the transposition piece embedded in the groove.

Figs. 10 and 11 are perspective views of an entire rod and of an individual lamina respectively of a modified type which is suitable in cases where very thin lamina or colateral conductors are used. In such a case the transposition from the bottom to the top layer at the point of change can be effected by folding the lamina, instead of bending it in the manner illustrated in Figs. 3 to 7. The lamina $a$ which is to be made to extend in a vertical direction past the lateral edges of the other laminæ, and with its flat surface turned toward these edges, is folded twice along oblique lines $n$ through angles of 180° and twice along lines $o$ through angles of 90° and hereby the same result as to the directions traversed is obtained as in the types of bar described above.

The transpositions $b$ in the rod will generally be executed at uniform distances along the slots or flight of slots in the motor or generator iron so that a single lamina is transposed at each point of change. But a plurality of laminæ also may be transposed at one and the same point as indicated in the perspective view of Fig. 12. In the rod here shown the two uppermost laminæ at each point of change, as for example $q^1$, $q^2$ are made to pass down side by side over the edge of the rod.

The described bars may be used for windings in any practical types of machines. The transpositions may be carried out within or without, or within and without the machine groove or slot.

We claim:

1. A laminated winding bar for electrical machines comprising laminæ of flat cross section piled one above the other and insulation between them, one lamina extending straight from the one end of the bar to the other end, and the other laminæ being transposed at some point so that each changes its position from the bottom lamina in one section of the bar to the top lamina in the next section, each lamina lying flat against its neighbouring lamina up to the said point and flat against the edges of all the other laminæ at the said point.

2. A laminated winding bar for electrical machines comprising laminæ of flat cross section piled one above the other and insulation between them, one lamina extending straight from the one end of the bar to the other end, and the other laminæ being transposed at some point so that each changes its position from the bottom lamina in one section of the bar to the top lamina in the next section, each lamina lying flat against its neighbouring lamina up to the said point and flat against the edges of all the other laminæ at the said point, the said one straight lamina being of a larger cross section than the other lamina.

3. A laminated winding bar for electrical machines, comprising laminæ of flat cross section with recesses in their edges and piled one above the other so that the recesses of the one lamina register with the recesses of the other and form a number of lateral grooves, insulation between the lamina, one lamina extending straight from the one end of the bar to the other end, and the other laminæ being transposed at one of the said grooves so that each changes its position from the bottom lamina in one section of the bar to the top lamina in the next section, each lamina lying flat against its neighbouring lamina up to the said groove and then lying in the said groove with its flat surface against the edges of all the other laminæ.

4. A laminated winding bar for electrical machines comprising laminæ of flat cross section piled one above the other and insulation between them, one lamina extending straight from the one end of the bar to the other end, and the other laminæ being transposed in groups at some point so that each changes its position from the bottom lamina in one section of the bar to the top lamina in the next section, each lamina lying flat against its neighbouring lamina up to the said point and flat against the edges of all the other laminæ at the said point.

In testimony whereof we have signed this specification in the presence of two witnesses.

FRANKLIN PUNGA.
HERMANN ROOS.

Witnesses:
 OSWALD RICHTER,
 HANS KANZ.